United States Patent
Gleason et al.

(10) Patent No.: US 10,421,197 B2
(45) Date of Patent: Sep. 24, 2019

(54) QUICK-CHANGE GRIPPER APPARATUS FOR A GRINDING SYSTEM

(71) Applicant: GLEBAR ACQUISITION, LLC, Ramsey, NJ (US)

(72) Inventors: Robert C. Gleason, Butler, NJ (US); John Bannayan, New York, NY (US)

(73) Assignee: Glebar Acquisition, LLC, Ramsey, NJ (US)

( * ) Notice: Subject to any disclaimer, the term of this patent is extended or adjusted under 35 U.S.C. 154(b) by 239 days.

(21) Appl. No.: 15/467,509

(22) Filed: Mar. 23, 2017

(65) Prior Publication Data

US 2017/0274538 A1   Sep. 28, 2017

Related U.S. Application Data

(60) Provisional application No. 62/312,116, filed on Mar. 23, 2016.

(51) Int. Cl.
| | |
|---|---|
| *B24B 41/00* | (2006.01) |
| *B25J 15/04* | (2006.01) |
| *B25J 11/00* | (2006.01) |
| *B25J 15/00* | (2006.01) |

(52) U.S. Cl.
CPC .......... *B25J 15/045* (2013.01); *B24B 41/005* (2013.01); *B25J 11/0065* (2013.01); *B25J 15/0052* (2013.01)

(58) Field of Classification Search
CPC ... B24B 41/005; B25J 15/045; B25J 15/0065; B25J 15/0052
USPC ................ 451/5; 414/751.1, 752.1; 294/65
See application file for complete search history.

(56) References Cited

U.S. PATENT DOCUMENTS

| | | | | |
|---|---|---|---|---|
| 3,658,190 | A | | 4/1972 | Fournier .................... 214/1 BB |
| 4,444,423 | A | * | 4/1984 | Montferme ............. B65B 21/20 198/434 |
| 4,599,786 | A | * | 7/1986 | Uhtenwoldt ........... B23Q 7/046 483/14 |
| 4,650,234 | A | * | 3/1987 | Blatt ...................... B21D 43/18 294/65 |
| 4,886,157 | A | * | 12/1989 | Sunnen .................... B23Q 7/10 198/839 |

(Continued)

FOREIGN PATENT DOCUMENTS

DE    10 2007 026 454 A1    3/2009

*Primary Examiner* — George B Nguyen
(74) *Attorney, Agent, or Firm* — Venable LLP (57) ABSTRACT

A gripper apparatus for loading workpieces to a grinding system includes a mount, a gas-supply coupler, a gas manifold, pneumatic cylinders, and grippers. The gas-supply coupler is supported by the mount and has a first end that detachably mates with a corresponding coupler attached to an external gas-supply conduit. The gas manifold is supported by the mount and is coupled to a second end of the gas-supply coupler. The pneumatic cylinders are supported by the mount, with each pneumatic cylinder being arranged to receive a supply of gas via the gas manifold. The grippers are respectively attached to the pneumatic cylinders. Each gripper has an opened state and a closed state brought about by controlled actuation of a corresponding pneumatic cylinder. The mount includes openings, with each of the openings being structured to receive a corresponding shaft for attaching the mount to a gantry assembly of the grinding system.

41 Claims, 11 Drawing Sheets

(56) References Cited

U.S. PATENT DOCUMENTS

| | | | | |
|---|---|---|---|---|
| 5,115,599 | A * | 5/1992 | Stolzer | B23D 47/042 414/745.7 |
| 5,943,842 | A * | 8/1999 | de Koning | B65B 35/38 294/65 |
| 5,951,025 | A * | 9/1999 | Bohler | B23B 33/00 279/133 |
| 6,761,522 | B2 | 7/2004 | Jäger | 414/222.01 |
| 6,835,040 | B2 * | 12/2004 | Quiring | B23K 26/0838 414/281 |
| 6,988,933 | B2 * | 1/2006 | Yoritsune | B24B 49/16 451/21 |
| 7,134,833 | B2 * | 11/2006 | de Koning | B65G 47/91 414/753.1 |
| 7,261,350 | B2 * | 8/2007 | Isetani | B25J 15/0616 294/185 |
| 7,690,706 | B2 * | 4/2010 | Wild | B65G 47/907 198/468.3 |
| 8,758,084 | B2 * | 6/2014 | Knecht | B24B 3/54 451/10 |
| 2004/0042890 | A1 * | 3/2004 | Hirata | H05K 13/0413 414/752.1 |
| 2008/0181759 | A1 | 7/2008 | Gaegauf et al. | 414/751.1 |
| 2011/0254298 | A1 * | 10/2011 | Lomerson, Jr. | B25J 15/0616 294/65 |
| 2011/0291433 | A1 * | 12/2011 | Feng | B25J 9/0051 294/65 |
| 2015/0044948 | A1 | 2/2015 | Kottbus et al. | B24B 7/22 |

\* cited by examiner

QUICK-CHANGE GRIPPER APPARATUS FOR A GRINDING SYSTEM

CROSS-REFERENCE TO RELATED APPLICATION

The present application claims the benefit of U.S. Provisional Application No. 62/312,116 filed on Mar. 23, 2016, the entire contents of which is incorporated by reference herein.

FIELD OF THE INVENTION

The present invention relates to a gripper apparatus that is attachable to a grinding system to load workpieces for grinding. More specifically, the present invention relates to a gripper apparatus that is easily attached to a grinding system and that is easily detached from the grinding system, enabling the grinding system to be retooled easily from one gripper apparatus for gripping and loading workpieces of one type to another gripper apparatus for gripping and loading workpieces of another type.

RELATED ART

The mass production of parts by machine grinding relies on, among other things, efficient use of time and materials in order to be profitable. Efforts have been made to automate the loading of workpieces to grinding positions for grinding, as well as to automate the unloading of workpieces from the grinding positions after they have been ground. This automation has resulted in increased efficiency in mass producing large quantities of ground articles or workpieces.

However, unless the large quantities of mass-produced ground articles are used quickly, e.g., by being sold or by being incorporated in other articles or machinery, they require space for inventory or stock storage. Thus, while mass production can improve manufacturing efficiency in some respects, the storage considerations associated with mass production can decrease profitability, because the costs of storing the inventories of ground articles add to the overall cost of the ground articles.

Further, investments in materials are up-front costs associated with mass-produced ground articles, and these costs are not recovered unless the articles are sold or incorporated in products that are sold. If a design change makes some or all of the inventories of ground articles obsolete, the materials costs as well as the manufacturing costs can be lost; that is, they may not be recoverable costs.

Due to the concerns mentioned above, manufacturing has transitioned from mass production of large quantities of articles to just-in-time production, also known as lean production, which is a more streamlined way to manufacture products. Lean production entails the production of smaller quantities of parts as they are needed.

With respect to the lean production of ground articles or workpieces, the desire to grind smaller batches of articles coupled with the desire to use the grinding system efficiently has led to the use of the grinding system to grind a greater variety of articles in small batches. As a consequence, there is an increased need to retool the grinding system to grind the different varieties of articles. However, the downtime of the grinding system, so that the system can be repeatedly retooled to automatically load and unload small batches of different varieties or types of workpieces for grinding, can significantly reduce efficiency.

BRIEF DESCRIPTION OF THE INVENTION

The present invention is intended to improve manufacturing efficiency in grinding different types of articles or workpieces by providing a gripper apparatus that is easily installed on and removed from a grinding system. The easy installation and removal enables different gripper apparatuses to be changed quickly during retooling of the grinding system from grinding one type of article to grinding another type of article. The gripper apparatus grips workpieces to be ground, and loads or delivers the workpieces to grinding positions of the grinding system. Optionally, after the workpieces have been ground, the gripper apparatus also grips the ground workpieces to unload them from the grinding positions.

According to an embodiment of the invention, a gripper apparatus for loading workpieces to a grinding system includes a mount, a gas-supply coupler, a gas manifold, pneumatic cylinders, and grippers. The gas-supply coupler is supported by the mount and has first and second ends. The first end of the gas-supply coupler is structured to detachably mate with a corresponding coupler attached to an external gas-supply conduit. The gas manifold is supported by the mount and is coupled to the second end of the gas-supply coupler. The pneumatic cylinders are supported by the mount, with each pneumatic cylinder being arranged to receive a supply of gas via the gas manifold. The grippers are respectively attached to the pneumatic cylinders. Each gripper has an opened state and a closed state brought about by controlled actuation of a corresponding pneumatic cylinder. The mount includes openings, with each of the openings being structured to receive a corresponding shaft for attaching the mount to the grinding system.

According to an aspect of the embodiment, the openings in the mount are slots formed at an edge of the mount or at edges of the mount, with a portion of each of the slots being open for slidably receiving the corresponding shaft therein.

According to an aspect of the embodiment, the openings in the mount are through-holes, with each through-hole being structured to receive the corresponding shaft therethrough.

According to an aspect of the embodiment, each shaft corresponds to a screw that, when tightened, rigidly attaches the mount to the grinding system. Optionally, the screw may have a knurled head for facilitating fingertip tightening and loosening.

According to an aspect of the embodiment, the gas-supply coupler supported by the mount and the corresponding coupler attached to the external gas-supply conduit are part of a set of quick-connect gas connection fittings.

According to another embodiment of the invention, a gripper apparatus for loading workpieces to a grinding system includes a mount, an electrical coupler, a wiring bus, and electric grippers. The electrical coupler is supported by the mount and has first and second ends. The first end of the electrical coupler is structured to detachably mate with a corresponding coupler attached to an external controller. The wiring bus is supported by the mount and is electrically coupled to the second end of the electrical coupler. The electric grippers are supported by the mount, with each electric gripper being structured to receive a control signal from the external controller via the wiring bus. Each electric gripper has an opened state and a closed stated actuated by selective issuance of control signals from the external controller. The mount includes openings, with each opening being structured to receive a corresponding shaft for attaching the mount to the grinding system.

According to an aspect of the embodiment, the openings in the mount are slots formed at an edge of the mount or at edges of the mount, with a portion of each slot being open for slidably receiving the corresponding shaft therein.

According to an aspect of the embodiment, the openings in the mount are through-holes, with each through-hole being structured to receive the corresponding shaft therethrough.

According to an aspect of the embodiment, each shaft corresponds to a screw that, when tightened, rigidly attaches the mount to the grinding system. The screw has a knurled head for facilitating fingertip tightening and loosening.

According to an aspect of the embodiment, the electrical coupler supported by the mount and the corresponding coupler attached to the external controller are part of a set of quick-connect electrical connectors.

According to an aspect of the embodiment, the electric grippers receive a common control signal from the external controller.

According to an aspect of the embodiment, the electric grippers receive different control signals from the external controller.

According to an aspect of the embodiment, the external controller is a PLC (programmable logic controller).

BRIEF DESCRIPTION OF THE DRAWINGS

Embodiments of the present invention and aspects thereof will be more readily understood from a detailed description of the invention, provided below, considered in conjunction with the attached drawings, of which.

DETAILED DESCRIPTION OF THE INVENTION

Figure 1A:
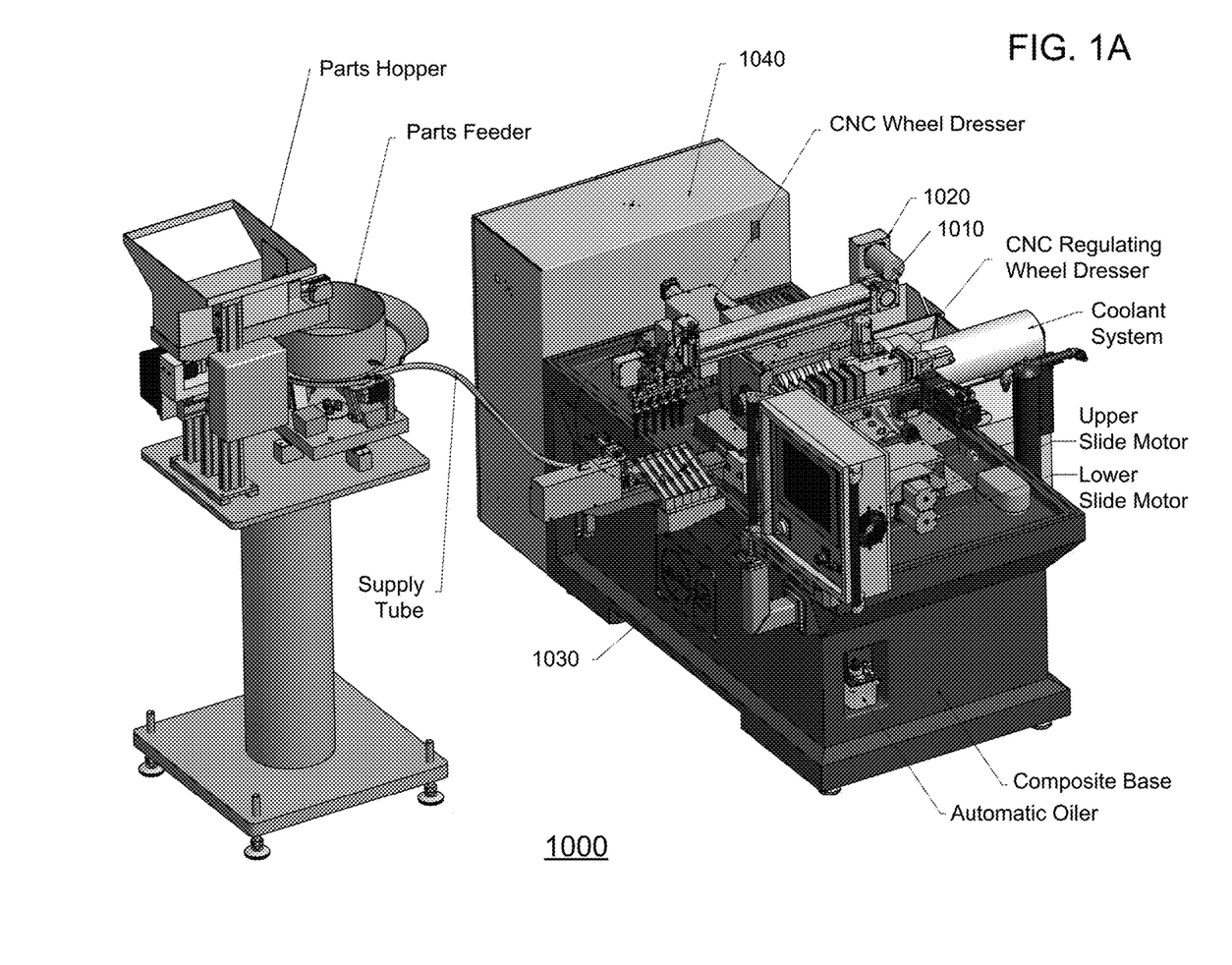
FIG. 1A schematically depicts a grinding system useable with a gripper apparatus according to an embodiment of the invention.
Figure 1B:
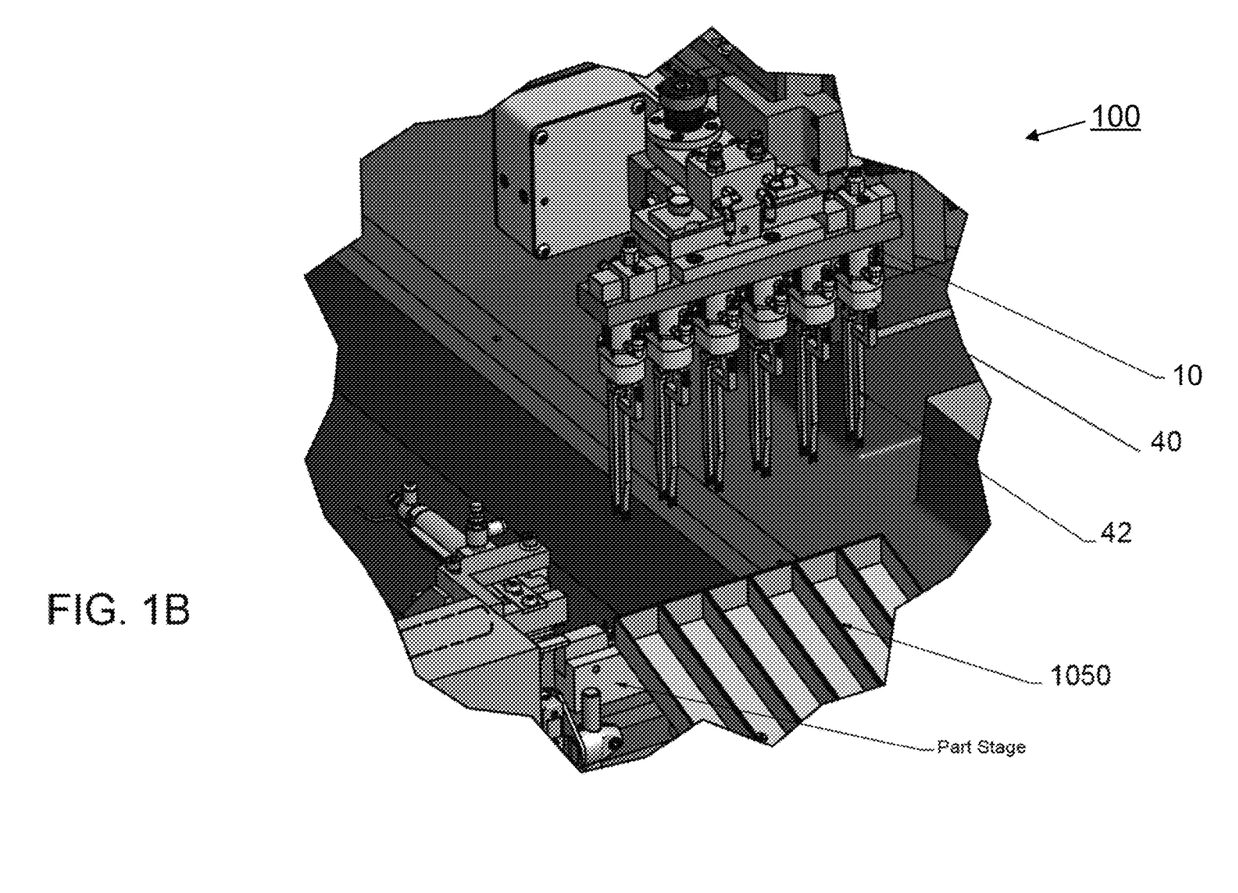
FIG. 1B schematically depicts an enlarged view of a region of the grinding system of FIG. 1 at which the gripper apparatus is installed.

FIG. 1A schematically shows a grinding system 1000 on which a gripper apparatus (or gripper assembly) according to embodiments of the present invention is installed. As used herein and/or in the drawings, the term "gripper apparatus" is interchangeable with the term "gripper assembly." FIG. 1B is an enlarged view of an encircled region in FIG. 1A, showing an enlarged depiction of a gripper apparatus according to an embodiment of the invention. The grinding system 1000 may be, for example, the GT-610 CNC (Glebar Company, Ramsey, N.J.) fitted with a gripper apparatus according to an embodiment of the invention.

Parts of the grinding system 1000 shown in FIG. 1A relevant to understanding an environment of a gripper apparatus according to one or more embodiments of the present invention are identified with reference numerals and are discussed below. Other parts of the grinding system 1000 not relevant to understanding an environment of a gripper apparatus according to one or more embodiments of the invention are not identified with reference numerals; these other parts are well known to persons skilled in the art of grinding technology and therefore will not be discussed herein.

First Embodiment

FIG. 1B is an enlarged view of an encircled region in FIG. 1A, showing a depiction of a gripper apparatus 100 according to a first embodiment of the present invention. The gripper apparatus 100 is removably attached to a gantry assembly 1020 of the grinding system 1000. A computer interface 1030 of the grinding system 1000 is useable by an operator to input instructions to a computer controller 1040 that controls operation of the grinding system 1000, including control of automated movement of the gantry assembly 1020 to move the gripper apparatus 100, and also including control of grip and release operations of the gripper apparatus 100.

Figure 2A:
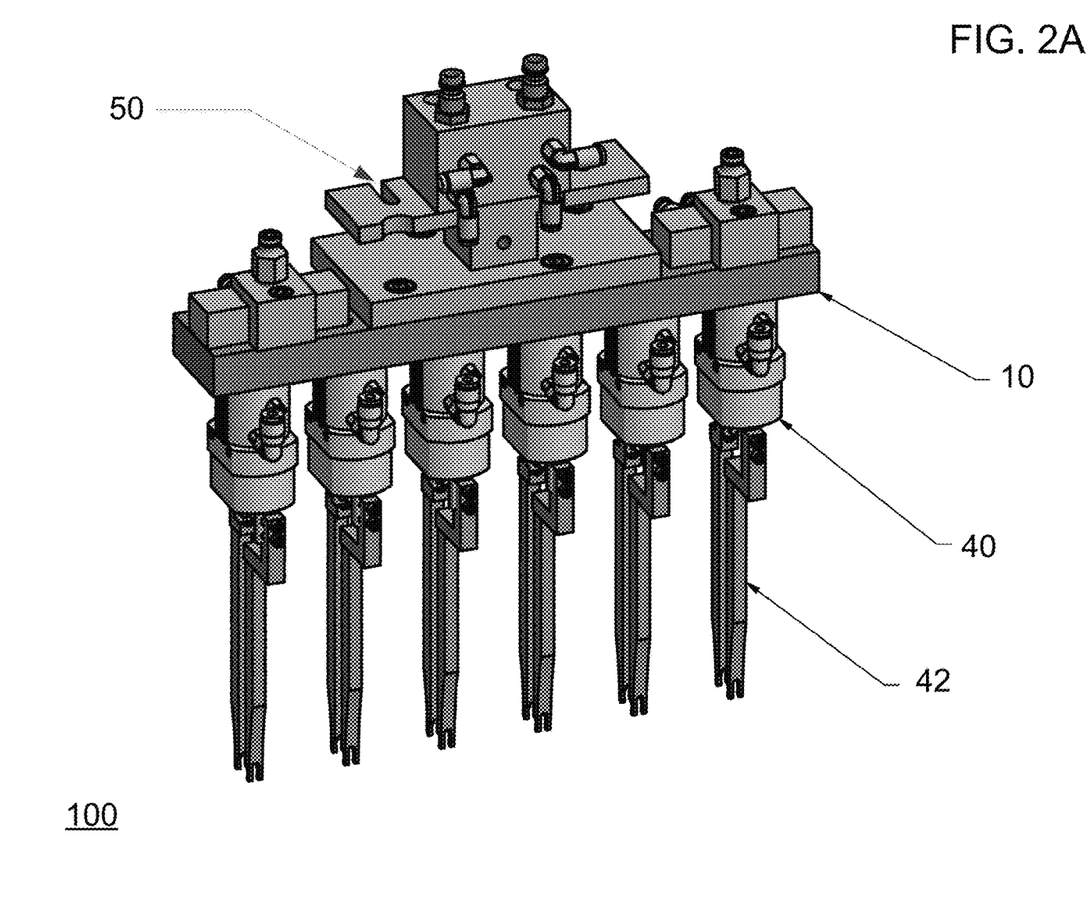
FIG. 2A schematically shows the gripper apparatus of FIG. 1B in an assembled state.
Figure 2B:
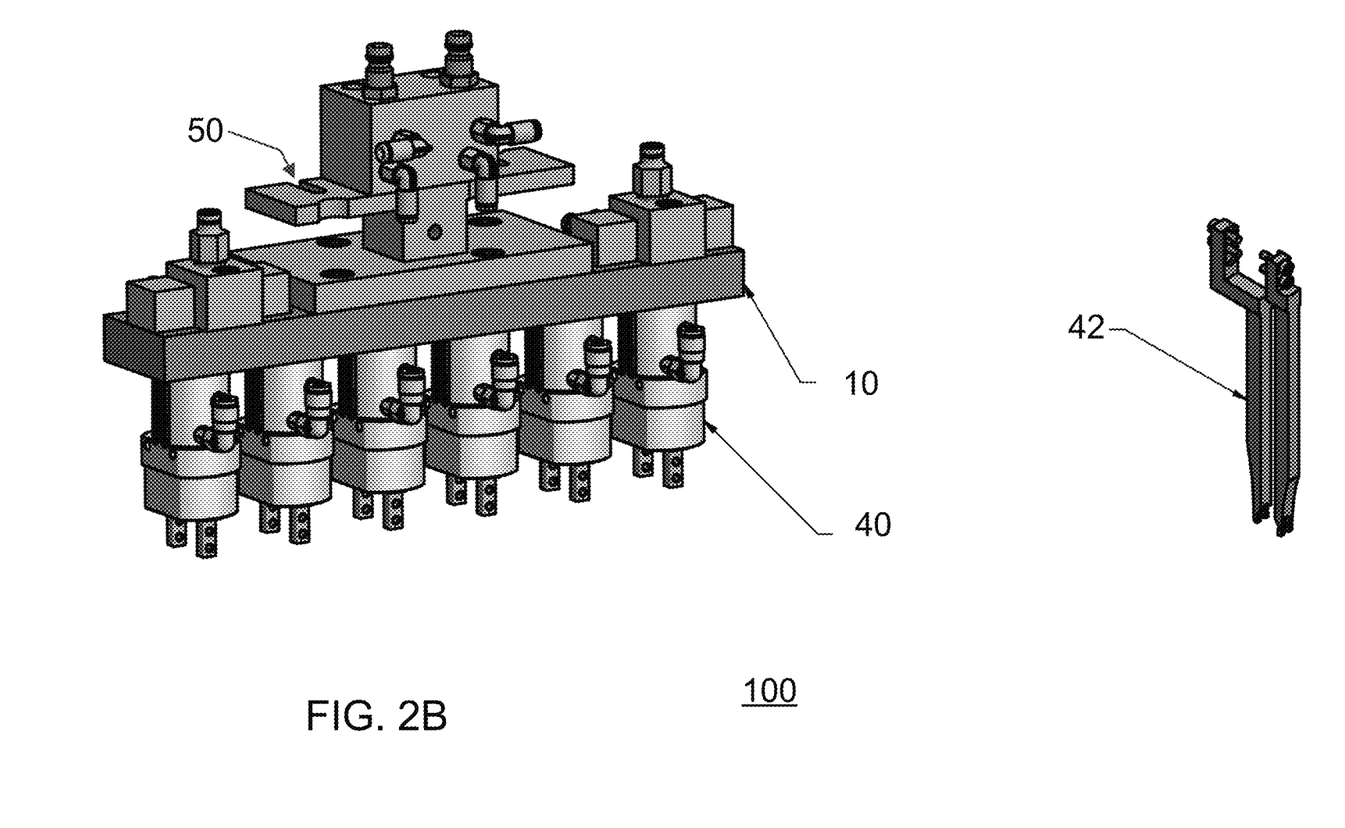
FIGS. 2B and 2C schematically show the gripper apparatus of FIG. 1B in disassembled states.
Figure 2C:
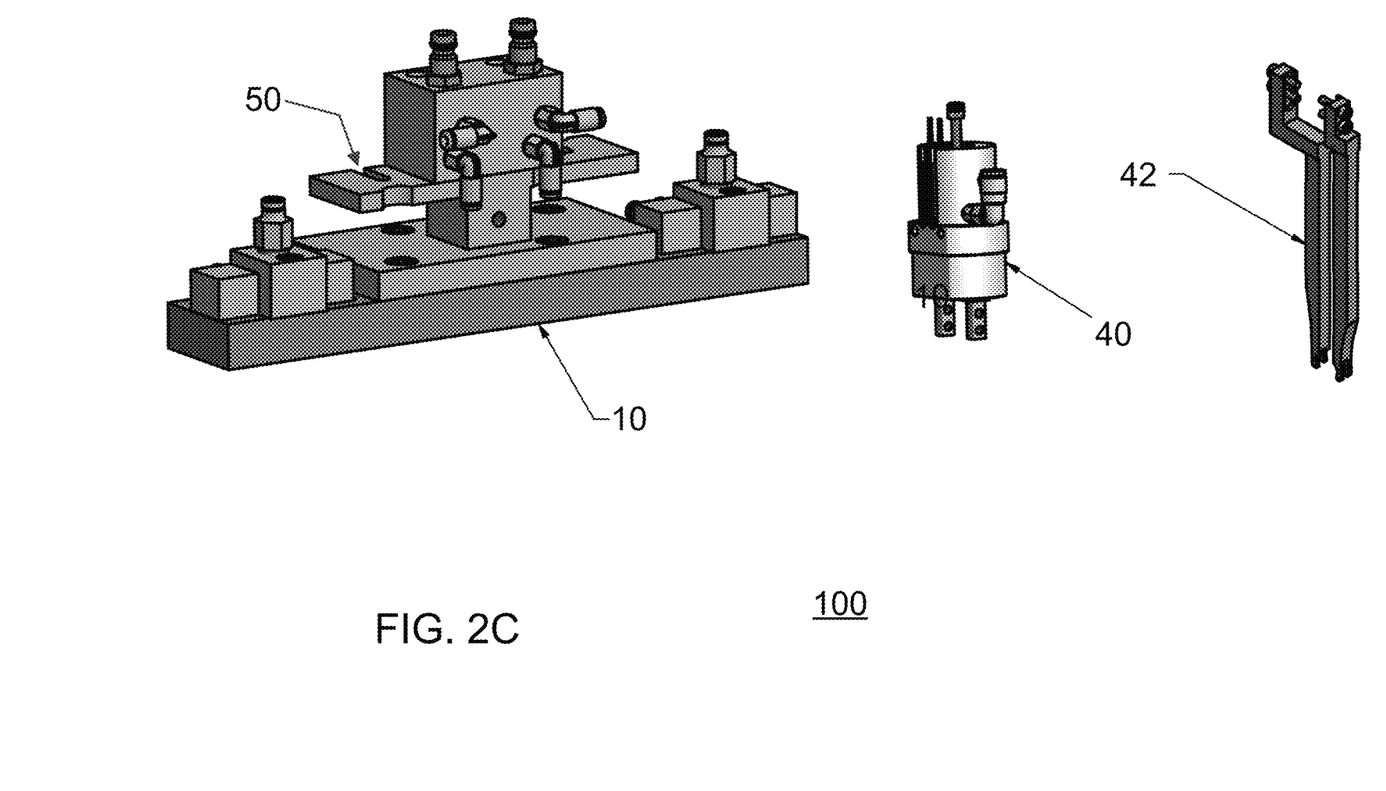
Figure 3A:
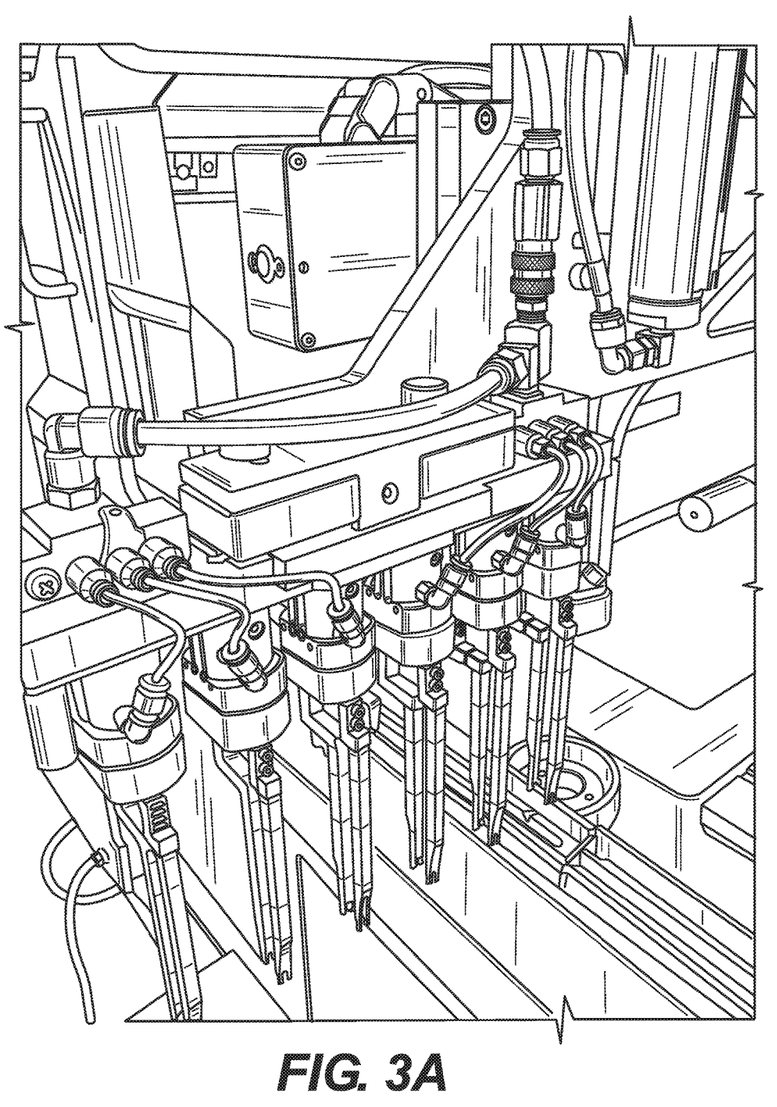
FIG. 3A shows an environment containing a gripper apparatus according to an embodiment of the invention, in which the gripper apparatus is operatively mounted on a gantry assembly of a grinding system.
Figure 3B:
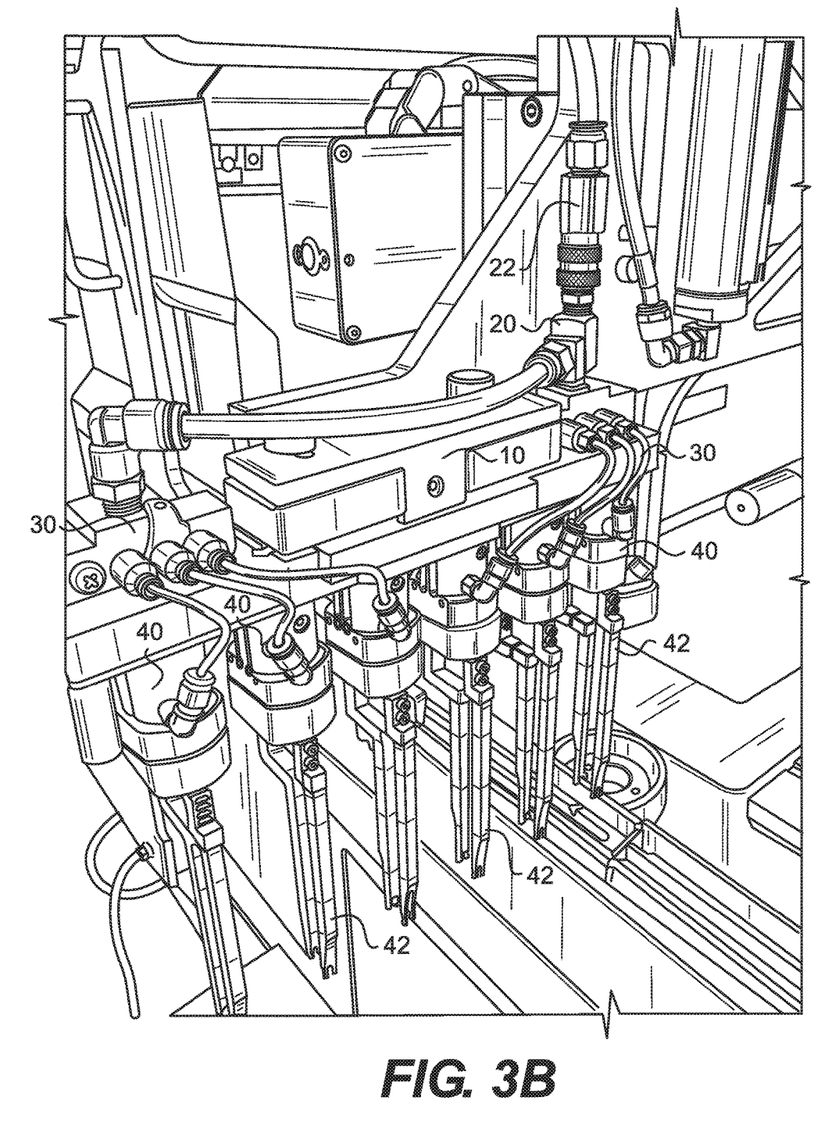
FIG. 3B shows the environment of FIG. 3A annotated with reference numerals.
Figure 4A:
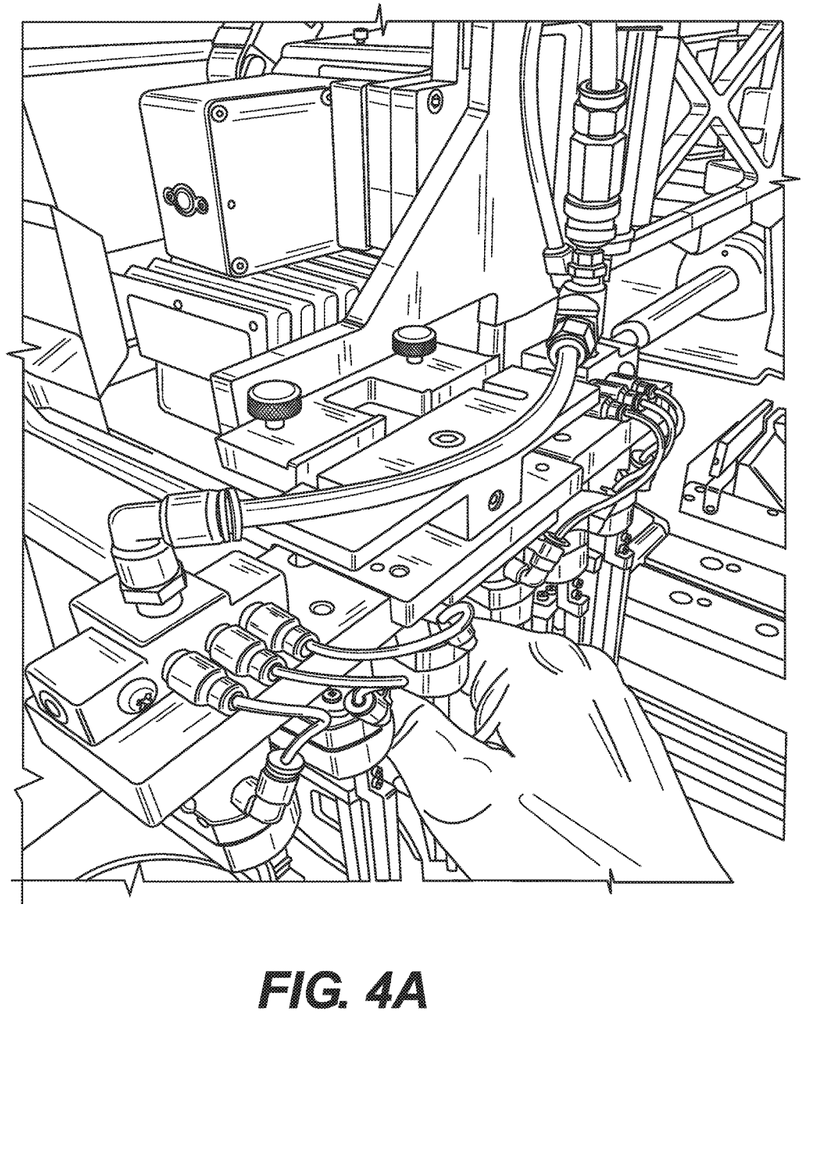
FIG. 4A shows an environment containing the gripper apparatus of FIGS. 3A and 3B, with the gripper apparatus partially dismounted from the gantry assembly of the grinding system.
Figure 4B:
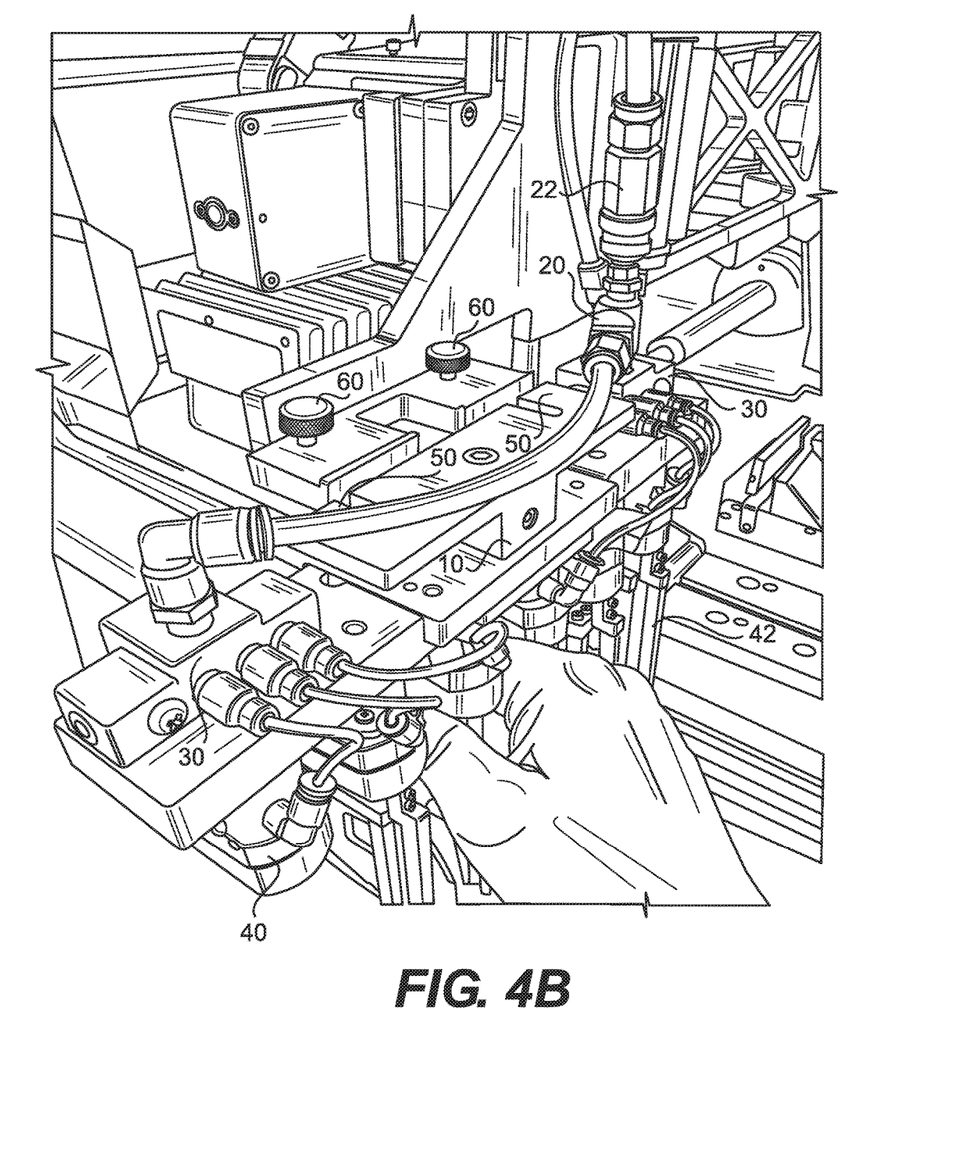
FIG. 4B shows the environment of FIG. 4A annotated with reference numerals.

The gripper apparatus 100 is schematically depicted in an assembled state in FIG. 2A. FIGS. 2B and 2C schematically depict the gripper apparatus 100 in disassembled states. FIG. 3A shows an environment containing the gripper apparatus 100, and FIG. 3B shows FIG. 3A annotated with reference numerals. Similarly, FIG. 4A shows an environment containing the gripper apparatus 100, and FIG. 4B shows FIG. 4A annotated with reference numerals.

The gripper apparatus 100 includes a mount 10, a gas-supply coupler 20 supported by the mount 10, and a gas manifold 30 supported by the mount 10. The gas-supply coupler 20 has first and second ends. The first end is structured to detachably mate with a corresponding coupler 22 connected to a conduit to an external gas-supply (not shown). The second end is coupled to the gas manifold 30.

The gripper apparatus 100 also includes pneumatic cylinders 40 supported by the mount 10. Each pneumatic cylinder 40 is arranged to receive a supply of gas via the gas manifold 30.

Grippers 42 are attached, respectively, to the pneumatic cylinders 40. Each gripper 42 has an opened state and a closed state controlled by a corresponding one of the pneumatic cylinders 40. In the closed state, the grippers 42 can grip and hold workpieces to be ground, to pick up and move the workpieces to grinding positions near the grinding wheel 1010.

The mount 10 includes openings 50, with each opening 50 being structured to receive a corresponding shaft 60 for attaching the mount 10 to the gantry assembly 1020 of the grinding system 1000. The gantry assembly 1020 is automated and is controlled by the computer controller 1040 of the grinding system 1000 to move the gripper apparatus 100 from a loading location, where each of the grippers 42 picks up a workpiece to be ground, to a grinding location, where the workpiece is deposited at a grinding position near the grinding wheel 1010.

During a loading operation, the gripper apparatus 100 is moved by the gantry assembly 1020 to the loading location to pick up workpieces from a workpiece tray 1050 (see FIG. 1B). The gantry assembly 1020 moves the gripper apparatus 100 (e.g., in any combination of x (left and right), y (forward and reverse), and z (up and down) directions) so that the grippers 42 of the gripper apparatus 100 are in pick-up positions to pick up the workpieces from the workpiece tray 1050. Automated grip and release operations of the gripper apparatus 100 are controlled by signals from the computer controller 1040. The signals control activation of a valve to the external gas-supply, which supplies pressurized gas for actuating the pneumatic cylinders 40. Once the grippers 42 are in their pick-up positions, the pneumatic cylinders 40 are actuated by the pressurized gas delivered via the gas manifold 30.

If the grippers 42 are normally in an opened state, then a signal from the computer controller 1040 results in actuation of the pneumatic cylinders 40, which cause the grippers 42 to move to a closed state to grip the workpieces on the workpiece tray 1050. The gantry assembly 1020 then moves the gripper apparatus 100 to pick up and move the workpieces to grinding positions near the grinding wheel 1010. A subsequent deactuation of the pneumatic cylinders 40 causes the grippers 42 to move to the opened state to release their grip on the workpieces, thus placing the workpieces at their grinding positions.

Similarly, if the grippers 42 are normally in the closed state, then a signal from the computer controller 1040 results in actuation of the pneumatic cylinders 40, which cause the grippers 42 to move to the opened state to embrace the workpieces on the workpiece tray 1050. A deactuation of the pneumatic cylinders 40 when the grippers 42 are embracing the workpieces causes the grippers 42 to move to the closed state to grip the workpieces. The gantry assembly 1020 then moves the gripper apparatus 100 to pick up and move the workpieces to their grinding positions near the grinding wheel 1010. A subsequent actuation of the pneumatic cylinders 40 causes the grippers 42 to move to the opened state to release their grip on the workpieces, thus placing the workpieces at their grinding positions.

In an aspect of the embodiment, the openings 50 in the mount 10 are slots formed at an edge of the mount 10. Optionally, the slots are formed at more than one edge of the mount 10. A portion of each slot is open for slidably receiving the corresponding shaft 60 therein, for securing the mount 10 to the gantry assembly 1020.

In another aspect of the embodiment, the openings 50 in the mount 10 are through-holes. Each through-hole is structured to receive the corresponding shaft 60 therethrough, for securing the mount 10 to the gantry assembly 1020.

In an aspect of the embodiment, each shaft 60 is a screw that, when tightened, rigidly attaches the mount 10 to the gantry assembly 1020 of the grinding system 1000. Optionally, the screw may have a knurled head to facilitate fingertip tightening and loosening.

In another aspect of the embodiment, each shaft 60 is a threaded rod. A wing-nut or similar fastening nut that, when tightened, rigidly attaches the mount 10 to the gantry assembly 1020 of the grinding system 1000.

In an aspect of the embodiment, the gas-supply coupler 20, which is supported by the mount 10, and the corresponding coupler 22, which is connected to the external gas-supply conduit, are part of a set of quick-connect gas connection fittings. This facilitates coupling and decoupling of the gas manifold 30 to and from the external gas-supply conduit.

Figure 5A:
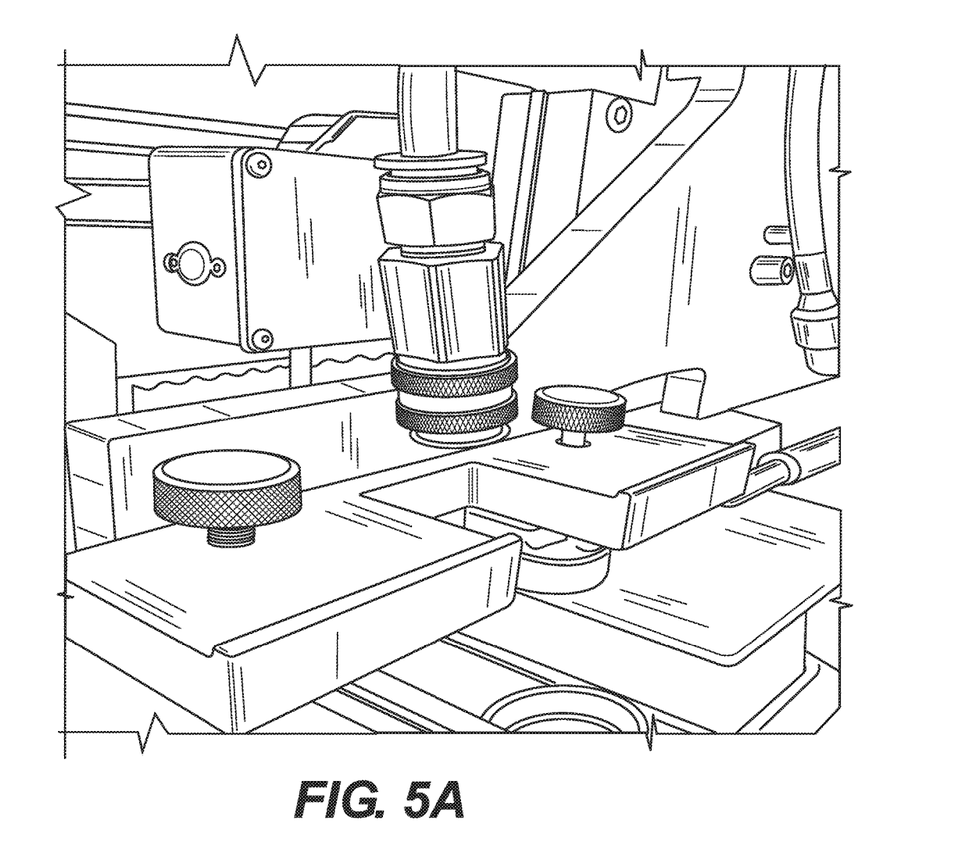
FIG. 5A shows a close-up view of an environment of a mounting region of the gantry assembly of the grinding system shown in FIGS. 3A, 3B, 4A, and 4B, at which a gripper apparatus according to embodiments of the invention are removably mountable.
Figure 5B:
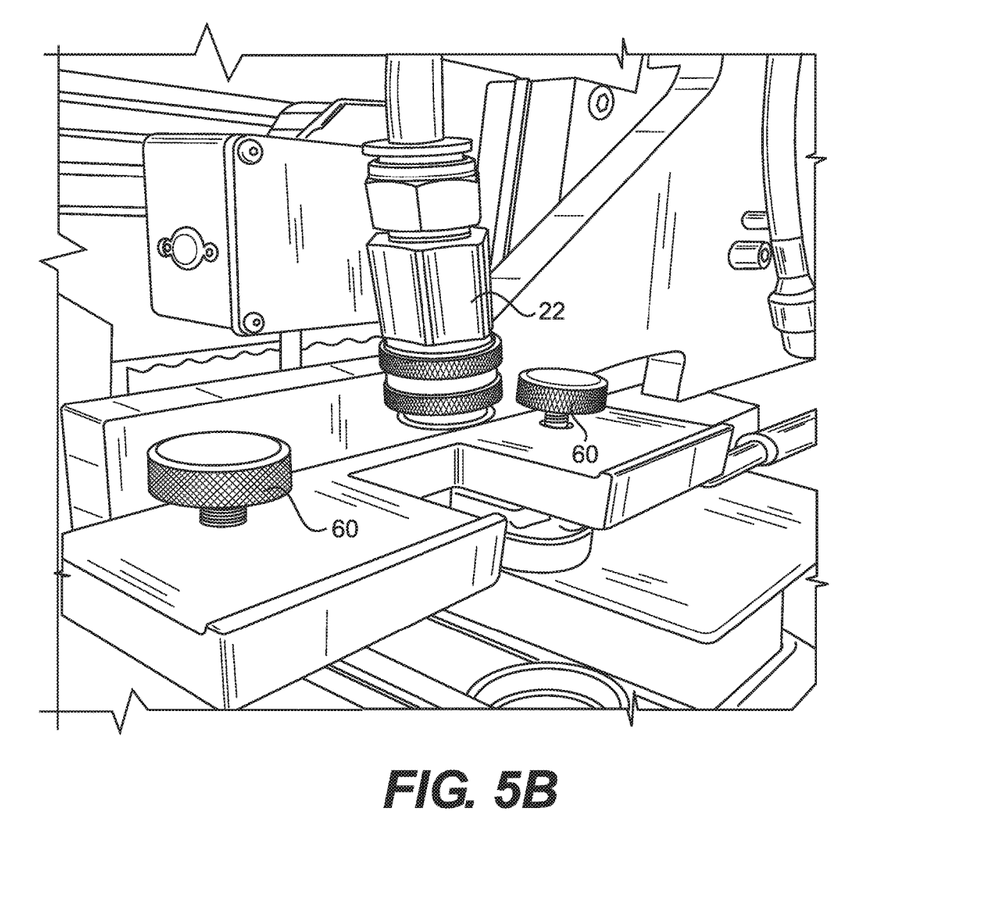
FIG. 5B shows the environment of FIG. 5A annotated with reference numerals.

FIG. 5A shows a view of an environment of a mounting region of the gantry assembly 1020 of the grinding system 1000 shown in FIGS. 3A, 3B, 4A, and 4B, with the mount 10 and the rest of the gripper apparatus 100 removed. FIG. 5B shows the environment of FIG. 5A annotated with reference numerals to show the shafts 60, which engage with the openings 50 in the mount 10, and to show the coupler 22 that detachably mates with the gas-supply coupler 20 of the gripper apparatus 100.

Second Embodiment

The gripper apparatus 100 according to the first embodiment of the present invention is described above to include more than one gripper 42 and more than one pneumatic cylinder 40. In a second embodiment of the invention, the gripper apparatus 100 includes only one gripper 42 and only one pneumatic cylinder 40, and therefore the gas manifold 30 is optional; other aspects and features of the first embodiment are the same or operatively similar in the second embodiment.

Third Embodiment

In the gripper apparatus 100 according to the second embodiment of the present invention, the mount 10 includes openings 50 structured to receive corresponding shafts 60 for attaching the mount 10 to the gantry assembly 1020 of the grinding system 1000. In a third embodiment of the invention, the mount 10 does not include the openings 50 of the second embodiment but instead includes other attachment means for securing the mount 10 to the gantry assembly 1020 of the grinding system 1000, so that the mount 10 is easily attached to and detached from the gantry assembly 1020.

In an aspect of the embodiment, the attachment means is a captive screw that mates with a threaded hole in the gantry assembly 1020. The captive screw is captive in the mount 10 and, when tightened, rigidly secures the mount 10 to the gantry assembly 1020 of the grinding system 1000. Optionally, the captive screw may have a knurled head to facilitate fingertip tightening and loosening.

In another aspect of the embodiment, the attachment means is a threaded shaft that extends from the mount 10 and that is receivable in a slot or a through hole of the gantry assembly 1020. Tightening of a wing-nut or similar fastening nut on the threaded shaft secures the mount 10 to the gantry assembly 1020 of the grinding system 1000.

Aside from the differences in the mount 10 described above, other aspects and features of the first embodiment are the same in the third embodiment.

Fourth Embodiment

The fourth embodiment of the present invention is similar to the first embodiment except that electrical actuation is used instead of pneumatic actuation. Thus, when the description identifies a feature with a reference numeral having an asterisk, the asterisk is intended to indicate that it is an electric counterpart to a pneumatic feature described in connection with the first embodiment (e.g., 20 and 20\* are counterparts of each other). Also, because the schematic drawings would be the same, the drawings for the first embodiment discussed above can be used to understand the fourth embodiment, with the understanding that each reference numeral having an asterisk is shown in the drawings schematically at the same reference numeral but without the asterisk.

In the fourth embodiment, an electrical gripper apparatus 100* includes a mount 10, an electrical coupler 20* supported by the mount 10, and a wiring bus 30* supported by the mount 10. The electrical coupler 20* has first and second ends. The first end of the electrical coupler 20* is structured to detachably mate with and electrically connect to a corresponding electrical coupler 22* electrically connected to an external controller such as the computer controller 1040 of the grinding system 1000. The second end of the electrical coupler 20* electrically connects with the wiring bus 30*.

The gripper apparatus 100 also includes electric grippers 40*/42* supported by the mount 10. (The reference numeral "40*/42*" is intended to indicate that each electric gripper performs in an equivalent manner the combined functions of the pneumatic cylinder 40 and the gripper 42 of the first embodiment.) Each electric gripper 40*/42* is arranged to receive electrical signals from the computer controller 1040 of the grinding system 1000 via the wiring bus 30*. For example, electric grippers marketed under the name "Robohand" (DESTACO, Auburn Hills, Mich.) may be used as the electric grippers 40*/42* of the gripper apparatus 100*.

Each electric gripper 40*/42* has an opened state and a closed state, similar to the grippers 42 of the first embodiment. In the closed state, the electric grippers 40*/42* can grip and hold workpieces to be ground, to pick up and move the workpieces to grinding positions near the grinding wheel 1010.

The mount 10 includes openings 50, with each opening 50 being structured to receive a corresponding shaft 60 for attaching the mount 10 to the gantry assembly 1020 of the grinding system 1000. The gantry assembly 1020 is automated and is controlled by the computer controller 1040 of the grinding system 1000 to move the gripper apparatus 100* from a loading location, where each of the electric grippers 40*/42* picks up a workpiece to be ground, to a grinding location, where the workpiece is deposited at a grinding position near the grinding wheel 1010.

During a loading operation, the gripper apparatus 100* is moved by the gantry assembly 1020 to the loading location to pick up workpieces from a workpiece tray 1050 (see FIG. 1B). The gantry assembly 1020 moves the gripper apparatus 100* (e.g., in any combination of x (left and right), y (forward and reverse), and z (up and down) directions) so that the electric grippers 40*/42* of the gripper apparatus 100* are in pick-up positions to pick up the workpieces from the workpiece tray 1050. Automated grip and release operations of the gripper apparatus 100* are controlled by signals from the computer controller 1040. That is, the signals control activation of grip and release movements of the electric grippers 40*/42*. Once the electric grippers 40*/42* are in their pick-up positions, the electric grippers 40*/42* are actuated by a signal or by signals delivered via the wiring bus 30*.

If the electric grippers 40*/42* are normally in an opened state, then a signal from the computer controller 1040 causes the electric grippers 40*/42* to move to a closed state to grip the workpieces on the workpiece tray 1050. The gantry assembly 1020 then moves the gripper apparatus 100* to pick up and move the workpieces to grinding positions near the grinding wheel 1010. A subsequent signal from the computer controller 1040 causes the electric grippers 40*/42* to move to the opened state to release their grip on the workpieces, thus placing the workpieces at their grinding positions.

Similarly, if the electric grippers 40*/42* are normally in the closed state, then a signal from the computer controller 1040 causes the electric grippers 40*/42* to move to the opened state to embrace the workpieces on the workpiece tray 1050. A further signal from the computer controller 1040 when the electric grippers 40*/42* are embracing the workpieces causes the electric grippers 40*/42* to move to the closed state to grip the workpieces. The gantry assembly 1020 then moves the gripper apparatus 100* to pick up and move the workpieces to their grinding positions near the grinding wheel 1010. A subsequent signal from the computer controller 1040 causes the electric grippers 40*/42* to move to the opened state to release their grip on the workpieces, thus placing the workpieces at their grinding positions.

In an aspect of the embodiment, the openings 50 in the mount 10 are slots formed at an edge of the mount 10. Optionally, the slots are formed at more than one edge of the mount 10. A portion of each slot is open for slidably receiving the corresponding shaft 60 therein, for securing the mount 10 to the gantry assembly 1020.

In another aspect of the embodiment, the openings 50 in the mount 10 are through-holes. Each through-hole is structured to receive the corresponding shaft 60 therethrough, for securing the mount 10 to the gantry assembly 1020.

In an aspect of the embodiment, each shaft 60 is a screw that, when tightened, rigidly attaches the mount 10 to the gantry assembly 1020 of the grinding system 1000. Optionally, the screw may have a knurled head to facilitate fingertip tightening and loosening.

In another aspect of the embodiment, each shaft 60 is a threaded rod. A wing-nut or similar fastening nut that, when tightened, rigidly attaches the mount 10 to the gantry assembly 1020 of the grinding system 1000.

In an aspect of the embodiment, the electrical coupler 20*, which is supported by the mount 10, and the corresponding electric coupler 22*, which is electrically connected to the computer controller 1040 of the grinding system 1000 via the wiring bus 30*, are part of a set of quick-connect electrical connectors. This facilitates coupling and decoupling of the wiring bus 30* to and from the computer controller 1040.

In an aspect of the embodiment, the electric grippers 40*/42* receive a common control signal from the the computer controller 1040.

In another aspect of the embodiment, the electric grippers 40*/42* receive different control signals from the computer controller 1040.

In another aspect of the embodiment, the computer controller 1040 includes a PLC (programmable logic controller).

Fifth Embodiment

The gripper apparatus 100* according to the fourth embodiment of the present invention is described above to include more than one electric gripper 40*/42*. In a fifth embodiment of the invention, the gripper apparatus 100* includes only electric gripper 40*/42*, and therefore the wiring bus 30* is optional; other aspects and features of the fourth embodiment are the same or operatively similar in the fifth embodiment.

Sixth Embodiment

In the gripper apparatus 100* according to the fifth embodiment of the present invention, the mount 10 includes openings 50 structured to receive corresponding shafts 60 for attaching the mount 10 to the gantry assembly 1020 of the grinding system 1000. In a sixth embodiment of the invention, the mount 10 does not include the openings 50 of the fifth embodiment but instead includes other attachment means for securing the mount 10 to the gantry assembly 1020 of the grinding system 1000, so that the mount 10 is easily attached to and detached from the gantry assembly 1020. The attachment means are similar to those described above for the third embodiment.

What is claimed is:

1. A gripper apparatus for loading grinding workpieces to a grinding system, the apparatus comprising:
    a mount;
    a gas-supply coupler supported by the mount, the gas-supply coupler having a first end structured to detachably mate with a corresponding coupler attached to a conduit to an external gas supply;
    a gas manifold supported by the mount and coupled to a second end of the gas-supply coupler;
    a plurality of pneumatic cylinders supported by the mount, each pneumatic cylinder being arranged to receive a supply of gas from the external gas supply via the gas manifold; and
    a plurality of grippers respectively attached to the pneumatic cylinders, each gripper having an opened position and a closed position actuated by a corresponding pneumatic cylinder,
    wherein the mount includes a plurality of openings, each of the openings being structured to receive a corresponding shaft for attaching the mount to a grinding system.

2. The gripper apparatus according to claim 1, wherein the openings in the mount are slots formed at an edge of the mount, with a portion of each slot being open for slidably receiving the corresponding shaft therein.

3. The gripper apparatus according to claim 2, wherein each shaft corresponds to a screw that, when tightened, rigidly attaches the mount to the grinding system, the screw having a knurled head enabling fingertip tightening and loosening.

4. The gripper apparatus according to claim 1, wherein the openings in the mount are slots formed at edges of the mount, with a portion of each slot being open for slidably receiving the corresponding shaft therein.

5. The gripper apparatus according to claim 4, wherein each shaft corresponds to a screw that, when tightened, rigidly attaches the mount to the grinding system, the screw having a knurled head enabling fingertip tightening and loosening.

6. The gripper apparatus according to claim 1, wherein the openings in the mount are through-holes, with each through-hole being structured to receive the corresponding shaft therethrough.

7. The gripper apparatus according to claim 6, wherein each shaft corresponds to a screw that, when tightened, rigidly attaches the mount to the grinding system, the screw having a knurled head enabling fingertip tightening and loosening.

8. The gripper apparatus according to claim 1, wherein the gas-supply coupler supported by the mount and the corresponding coupler attached to the conduit to the external gas supply are part of a set of quick-connect gas connection fittings.

9. A gripper apparatus for loading grinding workpieces to a grinding system, the apparatus comprising:
    a mount;
    a gas-supply coupler supported by the mount, the gas-supply coupler having a first end structured to detachably mate with a corresponding coupler connected to a conduit to an external gas supply;
    a pneumatic cylinder supported by the mount and connected to a second end of the gas-supply coupler to receive a supply of gas from the external gas supply; and
    a gripper attached to the pneumatic cylinder, the gripper having an opened position and a closed position actuated by the pneumatic cylinder,
    wherein the mount includes at least one opening structured to receive a corresponding shaft for attaching the mount to a grinding system.

10. The gripper apparatus according to claim 9, wherein each opening in the mount is a slot formed at an edge of the mount, with a portion of the slot being open for slidably receiving the corresponding shaft therein.

11. The gripper apparatus according to claim 10, wherein each shaft corresponds to a screw that, when tightened, rigidly attaches the mount to the grinding system, the screw having a knurled head for fingertip tightening and loosening.

12. The gripper apparatus according to claim 9, wherein each opening in the mount is a through-hole structured to receive the corresponding shaft therethrough.

13. The gripper apparatus according to claim 12, wherein each shaft corresponds to a screw that, when tightened, rigidly attaches the mount to the grinding system, the screw having a knurled head for fingertip tightening and loosening.

14. The gripper apparatus according to claim 9, wherein the gas-supply coupler supported by the mount and the corresponding coupler connected to the conduit to the external gas supply are part of a set of quick-connect gas connection fittings.

15. A gripper apparatus for loading grinding workpieces to a grinding system, the apparatus comprising:
    a mount;
    a gas-supply coupler supported by the mount, the gas-supply coupler having a first end structured to detachably mate with a corresponding coupler connected to a conduit to an external gas supply;
    a pneumatic cylinder supported by the mount and connected to a second end of the gas-supply coupler to receive a supply of gas from the external gas supply; and
    a gripper attached to the pneumatic cylinder, the gripper having an opened position and a closed position actuated by the pneumatic cylinder,
    wherein the mount is attachable to and detachable from a grinding system by at least one screw having a knurled head for fingertip tightening and loosening.

16. The gripper apparatus according to claim 15, wherein the at least one screw, when tightened, causes the mount to be rigidly attached to the grinding system.

17. The gripper apparatus according to claim 15, wherein the mount slidably attaches to and detaches from the grinding system via at least one slot formed at an edge of the mount.

18. The gripper apparatus according to claim 15, wherein the gas-supply coupler supported by the mount and the corresponding coupler connected to the conduit to the external gas supply are part of a set of quick-connect gas connection fittings.

19. A gripper apparatus for loading grinding workpieces to a grinding system, the apparatus comprising:
    a mount;

an electrical coupler supported by the mount, the electrical coupler having a first end structured to detachably mate with a corresponding coupler attached to an external controller;
a wiring bus supported by the mount and coupled to a second end of the electrical coupler; and
a plurality of electric grippers supported by the mount, each electric gripper being structured to receive control signals from the external controller via the wiring bus, and each electric gripper having an opened position and a closed position actuated by the control signals from the external controller,
wherein the mount includes a plurality of openings, each of the openings being structured to receive a corresponding shaft for attaching the mount to a grinding system.

20. The gripper apparatus according to claim 19, wherein the openings in the mount are slots formed at an edge of the mount, with a portion of each slot being open for slidably receiving the corresponding shaft therein.

21. The gripper apparatus according to claim 20, wherein each shaft corresponds to a screw that, when tightened, rigidly attaches the mount to the grinding system, the screw having a knurled head enabling fingertip tightening and loosening.

22. The gripper apparatus according to claim 19, wherein the openings in the mount are slots formed at edges of the mount, with a portion of each slot being open for slidably receiving the corresponding shaft therein.

23. The gripper apparatus according to claim 22, wherein each shaft corresponds to a screw that, when tightened, rigidly attaches the mount to the grinding system, the screw having a knurled head enabling fingertip tightening and loosening.

24. The gripper apparatus according to claim 19, wherein the openings in the mount are through-holes, with each through-hole being structured to receive the corresponding shaft therethrough.

25. The gripper apparatus according to claim 24, wherein each shaft corresponds to a screw that, when tightened, rigidly attaches the mount to the grinding system, the screw having a knurled head enabling fingertip tightening and loosening.

26. The gripper apparatus according to claim 19, wherein the electrical coupler supported by the mount and the corresponding coupler attached to the external controller are part of a set of quick-connect electrical connectors.

27. The gripper apparatus according to claim 19, wherein the control signals from the external controller are common for the electric grippers.

28. The gripper apparatus according to claim 19, wherein the control signals from the external controller are different for each of the electric grippers.

29. The gripper apparatus according to claim 19, wherein the external controller is a PLC (programmable logic controller).

30. A gripper apparatus for loading grinding workpieces to a grinding system, the apparatus comprising:
a mount;
an electrical coupler supported by the mount, the electrical coupler having a first end structured to detachably mate with a corresponding coupler attached to an external controller; and
an electric gripper supported by the mount and coupled to a second end of the electric coupler to receive control signals from the external controller, the electric gripper having an opened position and a closed position actuated by the control signals,
wherein the mount includes at least one opening structured to receive a corresponding shaft for attaching the mount to a grinding system.

31. The gripper apparatus according to claim 30, wherein each opening in the mount is a slot formed at an edge of the mount, with a portion of the slot being open for slidably receiving the corresponding shaft therein.

32. The gripper apparatus according to claim 31, wherein each shaft corresponds to a screw that, when tightened, rigidly attaches the mount to the grinding system, the screw having a knurled head for fingertip tightening and loosening.

33. The gripper apparatus according to claim 30, wherein each opening in the mount is a through-hole structured to receive the corresponding shaft therethrough.

34. The gripper apparatus according to claim 33, wherein each shaft corresponds to a screw that, when tightened, rigidly attaches the mount to the grinding system, the screw having a knurled head for fingertip tightening and loosening.

35. The gripper apparatus according to claim 30, wherein the electrical coupler supported by the mount and the corresponding coupler attached to the external controller are part of a set of quick-connect electrical connectors.

36. The gripper apparatus according to claim 30, wherein the external controller is a PLC (programmable logic controller).

37. A gripper apparatus for loading grinding workpieces to a grinding system, the apparatus comprising:
a mount;
an electrical coupler supported by the mount, the electrical coupler having a first end structured to detachably mate with a corresponding coupler attached to an external controller; and
an electric gripper supported by the mount and coupled to a second end of the electrical coupler to receive control signals from the external controller, the electric gripper having an opened position and a closed position actuated by the control signals,
wherein the mount is attachable to and detachable from a grinding system by at least one screw having a knurled head for fingertip tightening and loosening.

38. The gripper apparatus according to claim 37, wherein the at least one screw, when tightened, causes the mount to be rigidly attached to the grinding system.

39. The gripper apparatus according to claim 37, wherein the mount slidably attaches to and detaches from the grinding system via at least one slot formed at an edge of the mount.

40. The gripper apparatus according to claim 37, wherein the electrical coupler supported by the mount and the corresponding coupler attached to the external controller are part of a set of quick-connect electrical connectors.

41. The gripper apparatus according to claim 40, wherein the external controller is a PLC (programmable logic controller).

* * * * *